United States Patent Office 3,555,044
Patented Jan. 12, 1971

3,555,044
HEXAHYDRO-NAPHTHOQUINONE
SEMICARBAZONES
Stephen I. Sallay, Montgomery, Pa., assignor to American Home Products Corporation, New York, N.Y., a corporation of Delaware
No Drawing. Filed Dec. 6, 1967, Ser. No. 688,359
Int. Cl. C07d 15/04
U.S. Cl. 260—340.7                    13 Claims

ABSTRACT OF THE DISCLOSURE

The invention is directed to hexahydro-naphthoquinone semicarbazones which are prepared by reacting substituted naphthoquinones cyclic ketals with thiosemicarbazides. These products have therapeutic activity as antagonists of Herpes simplex virus.

---

This invention relates to new chemical compounds. More particularly, it relates to novel hexahydro-naphthoquinone semicarbazones. The new hexahydro-naphthoquinone semicarbazones encompassed within the present invention are those defined by the structural formula:

I
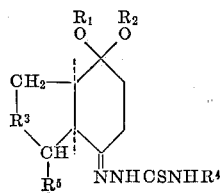

Where $R^1$ and $R^2$ when taken separately are the same member selected from the class consisting of lower alkyl having up to about three carbons, and when taken together form a ring and take the form

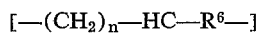

where $n$ is 1 or 2 and $R^6$ is hydrogen or lower alkyl having up to about three carbons in a straight chain;

$R^3$ is selected from the class consisting of vinylene (—CH=CH—), ethylene (—CH$_2$—CH$_2$—) and epoxyethylene

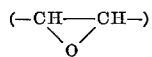

groups;

$R^4$ is selected from the class consisting of hydrogen, lower alkyl having up to about three carbons, and adamantyl; and $R^5$ is selected from the class consisting of hydrogen, and lower alkyl having up to about three carbons;

Typically, the compounds of this invention may be prepared as follows:

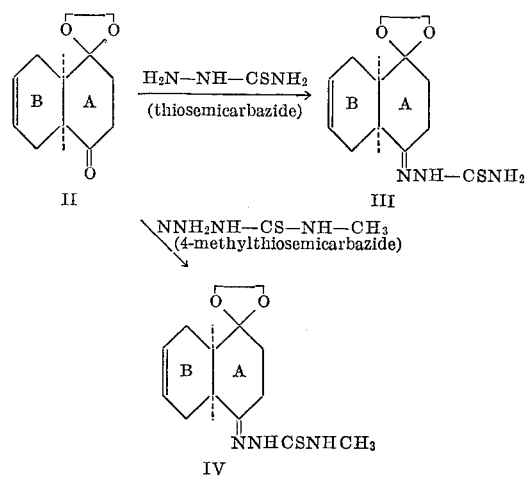

The junction of ring A and ring B in the product compounds of this may be either cis or trans. Surprisingly, only the cis compounds show the therapeutic effects characteristic of the present invention.

The preparation of compound II is described in U.S. Pat. No. 3,294,817, issued Dec. 27, 1966. The preparation of adamantyl thiosemicarbazide is described in U.S. patent application, Ser. No. 587,985, filed Oct. 20, 1966, and entitled "Antiviral Compounds," now Pat. 3,406,180, granted Oct. 15, 1968. Other starting compounds may be prepared as described in R. S. McElhinney, J. Chem. Soc., 950–955 (1966).

To prepare the hexahydro-naphthoquinone semicarbazones of the invention a cis-hexahydro-naphthoquinone cyclic ketal is dissolved in a lower alkanol, and thiosemicarbazide or a lower alkyl derivative thereof is added. The mixture is heated at a temperature range of about 60° C. to about 100° C., preferably at the reflux temperature, for a period of about thirty minutes to five hours.

When the reaction is complete, the product precipitates and may be recovered by well-known techniques. For instance, the product may be filtered off and refluxed in an alkyl ketone, such as acetone or methylethylketone for 10 to 60 minutes, preferably 15 minutes. Thereafter, the solid product is recovered by filtration. It has been found that the cis-form of the product is relatively insoluble, and care must be taken to recover the pure cis-form of the product. Repeated and lengthy refluxing in an alkylketone may be required. During the refluxing, the cis-form of the product dissolves only slightly, about one microgram per cubic centimeter of solvent, but it is believed that during the reflux the crystalline form is changed to a microcrystalline form.

In accord with the present invention, the new and novel hexahydro-naphthoquinone semicarbazones have been found to possess interesting pharmaceutical properties which render them useful as synthetic medicinals. More particularly, the compounds in standard pharmacological tests, have exhibited activity against Herpes Simplex virus in mice. Particular members have exhibited additional activity. For example, cis-2,3,4a,5,8,8a-hexahydro-1,4-naphthoquinone, cyclic 1-(ethylene acetal), 4-thiosemicarbazone is also active against Influenza NWS, Vaccinia (IHD) and Varicella viruses.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE I

This example illustrates the preparation of cis-2,3,4a,5,8,8a-hexahydro-1,4-naphthoquinone, cyclic 1 - (ethylene acetal), 4-thiosemicarbazone. A solution of six grams (0.028 mole) of cis-2,3,4a,5,8,8a-hexahydro-1,4-naphthoquinone, cyclic 1-(ethylene acetal) in 50 ml. ethanol is treated with 2.63 g. of thiosemicarbazide and refluxed for 30 minutes. The white crystalline precipitate is filtered off and refluxed in 200 ml. of methylethylketone for 15 minutes. The hot suspension is filtered and 4.76 g. of cis-2,3,4a,5,8,8a-hexahydro-1,4-naphthoquinone, cyclic 1-(ethylene acetal), 4-thiosemicarbazone is obtained. The product has a melting point of 190–191° C.

Based on the formula $C_{13}H_{19}N_3O_2S$, it is calculated that the elemental analysis for the product would be 55.50 percent carbon, 6.81 percent hydrogen, and 14.94 percent nitrogen. The product is analysed and the elemental content is found to be 55.23 percent carbon, 6.58 percent hydrogen, and 15.11 percent nitrogen. The foregoing may be expressed:

*Analysis.*—Calcd. for $C_{13}H_{19}N_3O_2S$ (percent): C, 55.50; H, 6.81; N, 14.94. Found (percent): C, 55.23; H, 6.58; N, 15.11.

Following the procedure of Example I, substituting each of the starting materials listed below for cis-2,3,4a,5,8,8a-hexahydro-1,4-naphthoquinone, cyclic 1-(ethylene acetal) results in the product listed opposite it.

| Starting Material | Product |
|---|---|
| A. Cis-6,7-epoxy-2,3,4a,5,8,8a-hexahydro-1,4-naphthoquinone, cyclic 1-(ethylene acetal). | Cis-6,7-epoxy-2,3,4a,5,8,8a-hexahydro-1,4-naphthoquinone, cyclic 1-(ethylene acetal), 4-thiosemicarbazone. |
| B. Cis-2,3,4a,5,8,8a-hexahydro-1,4-naphthoquinone-5-propyl, cyclic 1-(ethylene acetal). | Cis-2,3,4a,5,8,8a-hexahydro-1,4-naphthoquinone-5-propyl, cyclic 1-(ethylene acetal), 4-thiosemicarbazone. |
| C. Cis-2,3,4a,5,8,8a-hexahydro-1,4-naphthoquinone cyclic-1-(-1-propyl-1,3 propanediyl) acetal. | Cis-2,3,4a,5,8,8a-hexahydro-1,4-naphthoquinone cyclic-1-(-1-propyl-1,3 propanediyl) acetal, 4-thiosemicarbazone. |
| D. Cis-2,3,4a,5,8,8a-hexahydro-1,4-naphthoquinone, cyclic 1-trimethylene acetal. | Cis-2,3,4a,5,8,8a-hexahydro-1,4-naphthoquinone, cyclic 1-trimethylene acetal, 4-thiosemicarbazone. |
| E. Cis-2,3,4a,5,8,8a-hexahydro-1,4-naphthoquinone, cyclic-1-(1-methylethylene)acetal. | Cis-2,3,4a,5,8,8a-hexahydro-1,4-naphthoquinone, cyclic-1-(1-methylethylene)acetal, 4-thiosemicarbazone. |
| F. Cis-2,3,4a,5,8,8a-hexahydro-5-methyl-1,4-naphthoquinone, cyclic 1-(ethylene acetal). | Cis-2,3,4a,5,8,8a-hexahydro-5-methyl-1,4-naphthoquinone, cyclic 1-(ethylene acetal), 4-thiosemicarbazone. |
| G. Cis-2,3,4a,5,8,8a-hexahydro-1,4-naphthoquinone-dipropyl acetal. | Cis-2,3,4a,5,8,8a-hexahydro-1,4-naphthoquinone-dipropyl acetal, 4-thiosemicarbazone. |
| H. Cis-2,3,4a,5,8,8a-hexahydro-1,4-naphthoquinone-dimethyl-acetal. | Cis-2,3,4a,5,8,8a-hexahydro-1,4-naphthoquinone-dimethyl-acetal, 4-thiosemicarbazone. |

EXAMPLE II

This example illustrates the preparation of cis-2,3,4a,5,8,8a-hexahydro-1,4-naphthoquinone, cyclic 1-(ethylene acetal), 4-(4-methylthiosemicarbazone). Following the procedure of Example I, 6.0 g. of cis-2,3,4a,5,8,8a-hexahydro-1,4-naphthoquinone, cyclic-1-(ethylene acetal) are refluxed with 3.03 g. of 4-methylthiosemicarbazide for 15–60 minutes. The hot reaction mixture is treated with n-hexane until crystals start to separate. The filtered crystalline product is twice recrystallized from ethanol. The yield is 3.13 g. of cis-2,3,4a,5,8,8a-hexahydro-1,4-naphthoquinone, cyclic 1-(ethylene acetal), 4-(4-methylthiosemicarbazone) having a melting point of 178–179° C.

*Analysis.*—Calcd. for $C_{14}H_{21}O_2N_3S$ (percent): C, 56.93; H, 7.17; S, 10.83. Found (percent): C, 56.98; H, 6.99; S, 10.7.

Following the procedure of Example II and substituting each of the starting materials listed below for 4-methylthiosemicarbazide results in the product listed opposite it.

| Starting Material | Product |
|---|---|
| A. 4-propylthiosemicarbazide | Cis-2,3,4a,5,8,8a-hexahydro-1,4-naphthoquinone, cyclic 1-(ethylene acetal), 4-propylthio-semicarbazone. |
| B. 4-(1-adamantanyl)-3-thiosemicarbazide | Cis-2,3,4a,5,8,8a-hexahydro-1,4-naphthoquinone, cyclic 1, (ethylene acetal), 4-(1-adamantanyl)-3-thiosemicarbazone. |

EXAMPLES III AND IV

The following procedure is used to determine activity against Herpes virus. The hosts may be any standard experimental animals, such as mice, ferrets and rabbits, and the like, but mice are the preferred test subjects, and the test procedures described here are in regard to the use of mice as hosts.

For Herpes simplex virus mice weighing 10 to 12 grams are used. Prior to use all of the seed virus pools are titrated for infectivity, and the challenge dose used is one which will kill almost all of the non-treated control animals ($LD_{100}$).

Herpes simplex is inoculated intra-peritoneally. The soluble compounds to be tested are dissolved in an isotonic solution while the insoluble compounds to be tested are ground, then suspended in 0.5 percent carboxymethylcellulose (CMC) or the like.

The test compounds are then administered at various dose levels depending upon the activity of the compound, each dose level being orally administered to each of a group of ten mice. Two groups of ten mice each are not treated with the test compound and are used as controls. Treatment is delayed until after infection, and the best dosage schedule used is determined for each compound. The observation period for mice infected with Herpes simplex virus is 14 days.

The parameters used for evaluating the effectiveness of the test compounds are percentage of survivors, geometric mean survival time, and the Rank T test. When there are survivors among the control animals, a Rank T test is employed. The test compares the pattern of deaths among the treated animals with the pattern of deaths among the control animals, and is a measure of the prolongation of life produced by the compound being tested. The geometric mean survival time is determined by computation when there are no survivors among the control animals.

The scores for the treated animals are compared statistically with the scores of the control group. The accepted standard of $P<0.05$ is required for significance.

Details of the challenge of Herpes simplex virus in mice by the test compounds is shown in Table I. The results of the challenge are shown in Table II.

increased by small increments until the optimum effect under the circumstances is reached. It will generally be

TABLE I.—CHALLENGE WITH THE COMPOUNDS OF THIS INVENTION

| Example | Compound | Virus | Post-infection treatment, microgram (μg) per mouse | | | | | Total, μg | Number of hosts |
|---|---|---|---|---|---|---|---|---|---|
| | | | 1 hr. | 17½ hrs. | 44 hrs. | 70 hrs. | 95 hrs. | | |
| III: | | | | | | | | | |
| A | Cis-2,3,4a,5,8,8a-hexahydro-1,4-naphthoquinone, cyclic 1-(ethylene acetal) 4-thiosemicarbazone. | Herpes Simplex | 100 | 100 | 100 | 50 | 50 | 400 | 10 |
| B | | | 1,000 | 1,000 | 1,000 | 500 | 500 | 4,000 | 10 |
| C | | | 0 | 0 | 0 | 0 | 0 | 0 | 10 |
| D | | | 0 | 0 | 0 | 0 | 0 | 0 | 10 |
| | | | 2 hrs. | 23 hrs. | 48 hrs. | 72 hrs. | 97 hrs. | | |
| IV: | | | | | | | | | |
| A | Cis-2,3,4a,5,8,8a-hexahydro-1,4-naphthoquinone, cyclic 1-(ethylene acetal) 4-methylthiosemicarbazone. | Herpes Simplex | 0.1 | 0.1 | 0.1 | 0.1 | 0.1 | 0.5 | 10 |
| B | | | 1 | 1 | 1 | 1 | 1 | 5 | 10 |
| C | | | 10 | 10 | 10 | 10 | 10 | 50 | 10 |
| D | | | 0 | 0 | 0 | 0 | 0 | 0 | 10 |
| E | | | 0 | 0 | 0 | 0 | 0 | 0 | 10 |

TABLE II.—RESULTS OF CHALLENGE OF TABLE I

| Example | Deaths on day— | | | | | | | | Survivors | | |
|---|---|---|---|---|---|---|---|---|---|---|---|
| | 6 | 7 | 8 | 9 | 10 | 11 | 12 | 13 | Number | Significance | Rank T |
| III: | | | | | | | | | | | |
| A | 1 | 2 | 3 | 0 | 0 | 0 | 0 | 0 | 4 | P<0.05 | Not applicable. |
| B | 0 | 3 | 0 | 1 | 1 | 0 | 0 | 0 | 5 | P<0.05 | Do. |
| C | 0 | 3 | 4 | 1 | 1 | 1 | 0 | 0 | None | Control | Control. |
| D | 1 | 4 | 2 | 2 | 0 | 0 | 0 | 0 | 1 | do | Do. |
| IV: | | | | | | | | | | | |
| A | 1 | 0 | 4 | 1 | 1 | 1 | 0 | 0 | 2 | Not significant | P<0.05. |
| B | 0 | 3 | 1 | 2 | 0 | 0 | 0 | 1 | 3 | do | P<0.05. |
| C | 1 | 0 | 4 | 1 | 0 | 1 | 0 | 0 | 3 | do | P<0.05. |
| D | 1 | 6 | 2 | 0 | 0 | 0 | 0 | 0 | 1 | Control | Control. |
| E | 0 | 6 | 1 | 2 | 0 | 0 | 1 | 0 | None | do | Do. |

The absence of a dose response relationship is a characteristic of certain anti-viral agents. Any response at any dosage is a positive indication of anti-viral activity of the compound utilized. The reason for the absence of a dose response is uncertain. Without wishing to be bound by a theory of operation it is believed that the response may be due either to the fact that a minimum dose triggers an unknown host response mechanism or that only a minute amount of the test compound goes into solution regardless of the amount of insoluble compound in the dose.

It has been found that the physical form of the test compound is important. Best results are obtained by micronization. That is, by grinding the test compound to a maximum particle size of less than five microns ($<5\mu$).

As shown in Table II, an effective dose range against Herpes simplex virus has been found to be 0.5 microgram to 4 milligrams in mice weighing 10 to 12 grams.

When the compounds of this invention are employed as described above, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of suspensions or solutions which may contain coloring and flavoring agents. The solutions may be injected parenterally, intramuscularly, intravenously, or subcutaneously. For parenteral administration they may be used in the form of sterile solutions containing other solutes, for example, enough saline or glucose to make the solution isotonic.

The dosage of the present therapeutic agents will vary with the form of administration and the particular compound chosen. Furthermore it will vary with the particular subject under treatment. Generally, treatment is initiated with small dosages substantially less than the optimum dose of the compound. Thereafter, the dosage is found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound having the structural formula:

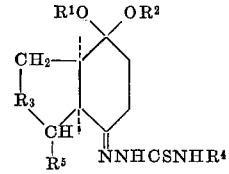

where $R^1$ and $R^2$ when taken separately are the same member selected from the class consisting of lower alkyl having up to three carbons, and when taken together are [—$(CH_2)n$—HC—$R^6$—], where $n$ is 1 or 2, and $R^6$ is hydrogen or lower alkyl having up to three carbons in a straight chain;

$R^3$ is selected from the class consisting of vinylene, ethylene and epoxyethylene groups;

$R^4$ is selected from the class consisting of hydrogen, lower alkyl having up to three carbons, and adamantyl;

$R^5$ is selected from the class consisting of hydrogen and lower alkyl having up to three carbons.

2. A compound as described in claim 1 which is: cis-2,3,4a,4,8,8a-hexahydro - 1,4 - naphthoquinone, cyclic 1-(ethylene acetal), 4-thiosemicarbazone.

3. A compound as described in claim 1 which is: cis-2,3,4a,5,8,8a-hexahydro - 1,4 - naphthoquinone, cyclic 1-(ethylene acetal), 4-(4-methylthiosemicarbazone).

4. A compound as described in claim 1 which is: cis-6,7-epoxy-2,3,4a,5,8,8a-hexahydro - 1,4 - naphthoquinone, cyclic 1-(ethylene acetal) 4-thiosemicarbazone.

5. A compound as described in claim 1 which is: cis-2,3,4a,5,8,8a-hexahydro-1,4-naphthoquinone - 5 - propyl, cyclic 1-(ethylene acetal), 4-thiosemicarbazone.

6. A compound as described in claim 1 which is: cis-2,3,4a,5,8,8a-hexahydro - 1,4 - naphthoquinone, cyclic 1-(-1-propyl-1,3 propanediyl) acetal, 4-thiosemicarbazone.

7. A compound as described in claim 1 which is: cis-2,3,4a,5,8,8a-hexahydro-1,4-naphthoquinone, cyclic 1-trimethylene acetal, 4-thiosemicarbazone.

8. A compound as described in claim 1 which is: cis-2,3,4a,5,8,8a-hexahydro-1,4-naphthoquinone, cyclic-1-(1-methylethylene)acetal, 4-thiosemicarbazone.

9. A compound as described in claim 1 which is: cis-2,3,4a,5,8,8a - hexahydro - 5-methyl-1,4-naphthoquinone, cyclic 1-(ethylene acetal), 4-thiosemicarbazone.

10. A compound as described in claim 1 which is: cis-2,3,4a,5,8,8a - hexahydro - 1,4 - naphthoquinone-dipropyl acetal, 4-thiosemicarbazone.

11. A compound as described in claim 1 which is: cis-2,3,4a,5,8,8a - hexahydro - 1,4-naphthoquinone-dimethyl-acetal, 4-thiosemicarbazone.

12. A compound as described in claim 1 which is: cis-2,3,4a,5,8,8a - hexahydro - 1,4 - naphthoquinone, cyclic 1-(ethylene acetal), 4-propylthiosemicarbazone.

13. A compound as described in claim 1 which is: cis-2,3,4a,5,8,8a - hexahydro - 1,4 - naphthoquinone, cyclic 1-(ethylene acetal), 4 - (1 - adamantanyl)-3-thiosemicarbazone.

References Cited

Palande, et al., "Chemical Abstracts," vol. 63 (1965), cols. 4216g–4218a (Abstract of article taken from "Indian J. Chem." vol. 3 (3), 1965, pp. 117–20).

ALEX MAZEL, Primary Examiner

J. H. TURNIPSEED, Assistant Examiner

U.S. Cl. X.R.

260—338, 340.9, 348, 554; 424—278